March 24, 1964 J. W. NELSON 3,126,471
CONTROL SYSTEM FOR WELDING MACHINERY
Filed Aug. 15, 1961 5 Sheets-Sheet 1

Jerome W. Nelson Inventor

By

Patent Attorney

March 24, 1964 J. W. NELSON 3,126,471
CONTROL SYSTEM FOR WELDING MACHINERY
Filed Aug. 15, 1961 5 Sheets-Sheet 2

DRIVE TRAIN SHOWING POSITION OF PROJECTIONS WHICH ACTIVATE
LIMIT SWITCHES. COMPLETING REVERSE DIRECTION WELD.
(96 TO ACTIVATE LS4 NEXT)

Jerome W. Nelson   Inventor
By *Edwin M. Thomas*

Patent Attorney

Jerome W. Nelson  Inventor

March 24, 1964 J. W. NELSON 3,126,471
CONTROL SYSTEM FOR WELDING MACHINERY
Filed Aug. 15, 1961 5 Sheets-Sheet 5

Jerome W. Nelson Inventor
By Edwin M. Thomas
Patent Attorney

United States Patent Office 3,126,471
Patented Mar. 24, 1964

3,126,471
CONTROL SYSTEM FOR WELDING MACHINERY
Jerome W. Nelson, Columbus, Ohio, assignor, by mesne assignments, to Esso Research and Engineering Company, Elizabeth, N.J., a corporation of Delaware
Filed Aug. 15, 1961, Ser. No. 131,594
13 Claims. (Cl. 219—60)

The present invention relates to a control system for welding machinery. It has particular application to a recently developed welding system for pipe lines and the like wherein a carefully sized spacing, groove or kerf is specially prepared, e.g., by cutting, between abutting pipe ends, the groove or kerf then being filled with weld metal. However, in some of its aspects, the present invention is not limited to a particular welding system. It also contemplates other preparatory operations, when these facilitate the actual welding operation per se.

Required controls are, of course, determined in considerable measure by the specific equipment or process to be controlled. The particular welding system or process mentioned above involves a sequence of operational steps which may include (1) abutting pipe ends together and aligning thm, (2) clamping adjacent ends of the pipe sections in fixed relative positions, (3) accurately forming between the abutting ends a space, groove, or kerf of predetermined type and dimensions to facilitate rapid and accurate welding, (4) feeding required welding material, preferably as a reeled wire electrode, at a controlled rate to fill said groove or kerf, (5) applying an electric arc of proper characteristics and at the proper location to fuse said welding material into the joint and unite said pipe ends, and (6) timing and controlling all of said operations for high efficiency. It is obvious that highly selective, timely and effective control must be had. Means for accomplishing such control is a primary object of the present invention.

A further object is to provide ways and means for the proper sequencing, timing, controlling and phasing of multiple step operations which operations comprise a welding operation of the general type described, with relatively simple and efficient control equipment. More specifically, the objct is to establish a plurality of live circuits for various sequential operations, suitably combined with sequential activator control means responsive to movement of an operator or an activator moving along a predetermined path.

Another object is to achieve flexibility of control by combining automatic and selective manual controls into a unitary system so that transfer from one to the other is facile and simple. This is accomplished in part by ganging some related controls together while still providing for the required independence of individual operative sequences. With such an arrangement, individual operations may be performed, under manual control, in any desired sequence or, alternatively a series of such operations may be performed by automatic means in an accurately timed proper sequence.

A still further object is to provide with minimum control elements a set of interlocking controls adequate to insure safety and to prevent operations proceeding in an undesirable sequence. An auxiliary object is to provide reliable safety controls to minimize hazards to equipment and personnel which controls are effective to prevent, as far as practicable, malfunctions and faulty performance during operation of the controlled equipment. For example, full safety requirements must be maintained while the following operations are performed: Clamp the pipe ends in proper juxtaposed position; cut a carefully controlled gap between them for a predetermined part, say, one-half, one-third or one-quarter of the circumference; remove the cutter, bring the welding head to weld-start position; close the welding circuit, turn on shielding gas, turn on cooling water, and start feeding electrode wire at full speed, all in proper sequence; traverse the head relatively along or around the joint; and to stop it precisely at the desired end point.

Additional objects will suggest themselves to those skilled in the art after the invention has been more particularly explained. Hence reference will next be made to the attached drawings illustrating a presently preferred embodiment of this invention, wherein.

Figure 1:
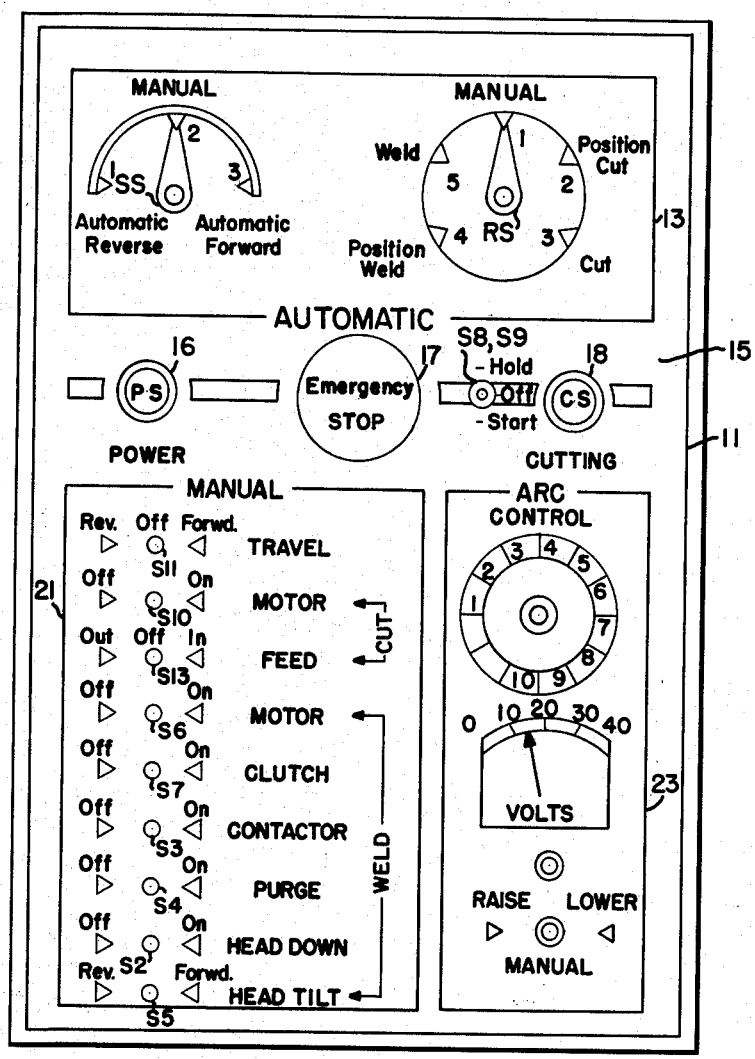
FIGURE 1 is an elevational view of the front panel of a control system embodying the invention.

Referring first to FIGURE 1, the general control system is here outlined. The main panel 11 is characterized by an upper gang control sub-panel 13, an intermediate sub-panel 15 for major emergency controls including the power switch 16, emergency stop switch 17, auxiliary or cutter control 18, and two lower main sub-panels 21 and 23. Panel 21 in the lower left part of the figure includes the manual switches and controls for manual operation where automatic control is not desired. Panel 23 contains equipment for control of the welding arc per se, which is an important functional part of the overall system but is relatively independent of the functional sequence controls with which this invention is primarily concerned.

Figure 2:
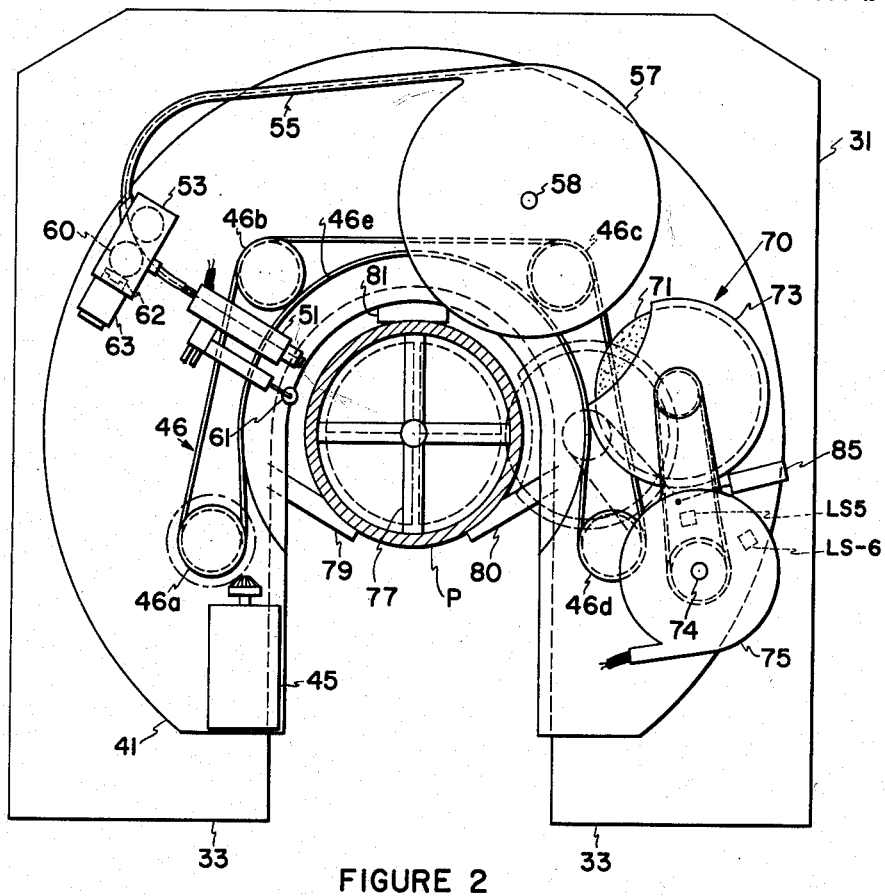
FIGURE 2 is a front elevational view, diagrammatic in nature, of a welding apparatus suitable for control by the present invention.

Referring now to FIGURE 2, a typical apparatus to be controlled is illustrated somewhat diagrammatically as comprising a frame or housing 31, having bifurcate side frame elements 33 adapted to straddle the pipeline joint to be welded, the pipe being indicated at P. This apparatus is of the general type described in an application of Rieppel et al., Serial No. 825,159, filed July 6, 1959.

The apparatus in general terms comprises a movable tool carrying head comprising a horse-shoe or C-shaped plate or frame member 41. This head preferably is adapted to rotate about the axis of the pipe. Alternatively the pipe may be rotated inside a stationary head 41, in which case the head 41 may be said to move relatively with respect to the pipe P or with respect to the two sections of pipe which are to be joined together end to end by welding. The head 41 is arranged to lie primarily in a plane parallel to and spaced fairly close to the juncture between the adjacent ends of pipe sections to be welded. Member 41 is rotated or at least moved relatively to the pipe surface, around the axis of the pipeline by a suitable drive mechanism forming no part of the present invention. In the example shown it comprises a reversible drive motor 45 and suitable mechanical drive elements. This motor operates a suitable propelling mechanism shown as a chain 46, to turn the frame 41 and the parts mounted thereon selectively in either rotational direction. Ordinarily the pipe is non-rotatable whereas the tools rotate around it, but obviously the system can operate by rotating the pipe under the tools as suggested above.

Frame or plate 41 carries a welding head or electrode contact member 51 and its associated electrode feeding equipment. The latter includes a weld electrode wire feeding device 53, a flexible wire guide tube 55, and a wire supply reel 57 rotatably mounted on a pin 58 supported by plate 41. A control tracking device 61 in the form of a feeler or light sharp-edged wheel, rides in and follows the groove or juncture between the abutted or nearly abutted pipe ends, and guides the welding head 51 precisely along the line to be welded. Wire feed device 53 includes pinch rolls 60, one of which may be positively operated through suitable clutching means 62 driven by a motor 63.

The head or frame member 41 also carries an auxiliary cutting apparatus as a kerf-forming device, shown generally at 70. This comprises, in the presently preferred form, a high-speed abrasive cutting disc 71, rotatably mounted on its own axis in a housing 73 from which it projects for a sufficient distance to cut through the pipe wall without interference between the housing 73 and the pipe. The housing 73 itself is pivotally mounted at 74 on support 41 and is adapted to be swung with the cutter into or out of cutting position with respect to the pipe, thus permitting the cutter to cut around he pipe when desired, or to be withdrawn out of the path of the pipe during the actual welding operation or when the machine is removed from the pipeline or a new section of pipe is to be inserted.

The wheel 71 is driven by a powerful motor 75 in order that the cutting may be rapidly accomplished, even in pipe of relatively thick walls. This motor is preferably electrically driven but may be operated by compressed air. It requires substantial power to obtain the desired rapid cutting rate. Hence it may draw a relatively high current and therefore normally requires relay switching means, to be explained below.

The welding machine and associated equipment comprise numerous additional details, some of which are not shown, but normally including an internal clamping device 77 to hold the pipe sections in place. It includes controls for the two separate and partially independent clamp elements or half clamps. One of these half clamps is inserted inside each of the pipe sections and the two parts are thereafter expanded or tightened independently to hold the pipe sections firmly in the proper juxtaposition for welding. These half clamps, of course, can also be contracted independently to release either half from its clamped pipe section. The clamp 77 is so designed that one of its parts (not shown in detail, but outlined in FIGURE 2) can be expanded into a first pipe section on one side, and the other half into a new pipe section to be added to the first, on the other side of the juncture to be welded. With this arrangement, one section can be firmly held while the other is being adjusted into position. Also included are means 79, 80, 81 for aligning the main unit frame 31 with, and clamping it firmly to the pipe sections.

The automatic control system of this invention operates on the principle of pre-activating simultaneously as many operating circuit components directly by electric switches as can be done, consistent with safe and timely operation. At the same time, complete and separately operable means are provided for controlling any part of the system or performing any single operative step by manual operation. For automatic operation, some operations are designated "positive critical" and such ordinarily will be accomplished under direct control of limit switches for safe and precisely timed operation, permitting accurate sequencing. Only those few operations requiring heavy electrical current, e.g. the welding arc, or the cutter, or requiring measured time delays, such as stopping time for the wire feed motor, are operated by relays. The controls therefore generally permit precision timing which is an important requisite for high speed and efficient welding. At the same time, a minimum of resetting of relays is required in case of emergency shut-down or malfunction, or in case of shift from automatic to manual operation or vice versa.

Figure 3:
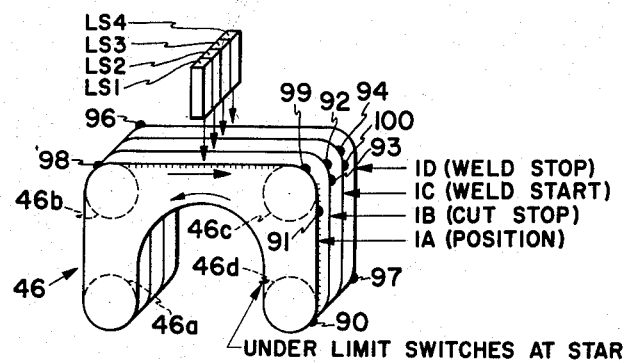
FIGURE 3 is a diagram of timing elements for controlling an operating sequence of functions required in the apparatus of FIGURE 2.
Figure 4:
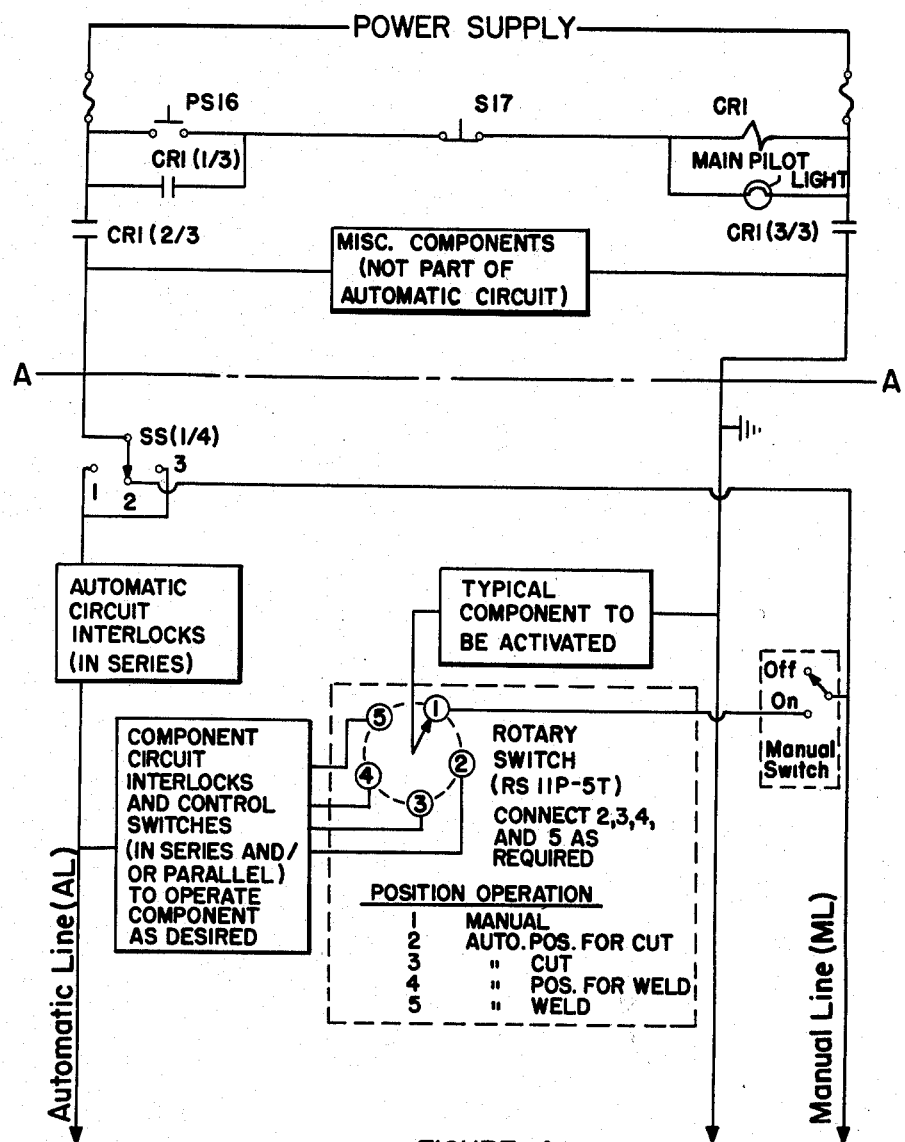
FIGURE 4 is a block wiring diagram showing the basic control approach.

The timed sequential operations are controlled in large part by using switching actuating elements distributed along one or more tracks, or preferably along a plurality of separate tracks or travel paths. These may be parallel. The traversing head 41, or the drive 46 therefor, carries switch elements, preferably limit switches, which operate at the proper time by contacting pawls or dogs along the travel path. Conversely, the limit switches may be placed in fixed positions along the path to be actuated by traveling dogs. In the illustrated embodiment, as the head 41 revolves with respect to frame 31 and the pipe, it carries various pieces of apparatus with it around the periphery of the pipe which is being operated upon. In this travel, actuating elements, i.e., dogs or pawls, along four different paths, 1A, 1B, 1C, 1D in FIGURE 3, are caused to contact moving limit switches carried by the head at the desired times and in the desired sequence to accomplish the essential timed control operations. These actuating elements are shown in the form of projections 90, 91, 92, 93, 94, 95, 96 and 97, FIGURE 3. Since the whole head assembly 41 is reversibly rotatable with respect to the pipe, and the welding or cutting, or both, can be accomplished in predetermined and controllable sequences in either direction, the operating controls are so arranged that they may be actuated selectively in proper order while cycling in either direction. That is to say, cutting or welding, or both, may take place in either rotational direction of head 41. The controls are also operative even though the operating equipment has gone through more than 360 degrees of rotation. To accomplish the desired reversibility some dogs or pawl elements in a given path may be so designed as to function in only one head travel direction and to remain inactive in the other direction.

Another feature is that of using certain sequence overlaps to advantage in certain operations. Thus, if plural operations, such as a cutting and a welding pass around part of the pipe, are to be activated in a forward direction, before a particular reverse operation such as a second partial cut, etc., both the cutting and the welding may be started in proper order and time by use of some of the same control elements.

Another convenient feature permitted by the simplified control system is the use of visible signals, such as lights of different colors, to show the precise condition of key parts of the circuit before automatic operations are started. The arrangement preferably is such that regardless of the position at which the equipment was last stopped, the operations will go on in proper order upon restarting.

The system also is preferably arranged for prevention of malfunction by placing control relays next to the grounded side of the electric circuit. With this arrangement, it is impossible to energize the relays by a short circuit in either the manual or the automatic switching.

An automatic circuit interlock system is provided to prevent the automatic cycle from being started without the necessary components being in working order. This comprises necessary monitor controls to prevent premature operations, such as welding before the cooling water is turned on, or to prevent annular travel of the cutting device before it has cut through the pipe wall thickness or has attained full cutting speed. Hence, by means of the interlock system, the automatic cycle is not started until the holding clamps are closed, the welding generator set is running at proper voltage, the cooling water is made available to the welding head, the shielding gas pressure is fully available, and other essential parts are activated, etc. The preliminary essential functions must first be properly provided or accomplished. Also, an interlock is provided between the automatic and the manual systems on the live side of the circuit to prevent inadvertent damage by accidental or purposeful manual interference while an automatic sequence is proceeding.

With the above general principles in mind, the invention will next be described in further detail by detailed reference to FIGURES 2, 3, 4, and 5.

The unit 41, FIGURE 2, which carries the operating tools, namely, the welding head or electrode 51 and the kerf-forming cutter 71 around the pipe, is designed to permit continuous rotation for somewhat more than a full 360 degrees in either direction. Except for the external connections such as wiring leads, compressed air supply, and the like, the unit could operate continuously in either direction for several complete turns. In practice, however, and to avoid commutation problems, it ordinarily need not and will not be operated much more than a full circle in either direction. Operations commonly require less than a full rotation of head 41. It is more usual to cut part way around, say slightly more than 90° or 180°, then reverse, move the weld head through the same arc, then cut in the reverse direction, weld the freshly cut portion, etc., until the weld is complete. Motor 45 provides the power for these rotations or partial rotations in both directions, through the drive means 46 and associated gearing already mentioned.

Depending somewhat on the size of the pipe to be welded, the preferred operation is normally to cut the groove or kerf part way around the circumference, weld this freshly cut portion, then continue the cut further and in the opposite rotational direction, and finally welding the continued cut portion. Several shorter steps may be used, with intermittent reversals, with repetition in similar steps until the operation is completed. Thereafter the apparatus is unclamped from the pipe and moved to the next joint. The internal clamping means also is collapsed and pulled forward to take care of the next weld.

For a very large pipe, cutting and welding may take four or more stages or steps around the circumference, whereas for small pipe it will frequently be accomplished in two cuts and two welding runs, each slightly more than 180°. In the latter case, cutting will proceed on one side from the top to just beyond the bottom, followed by welding the cut portion. Thereafter the other side will be cut from top to a point just beyond the bottom and likewise this will finally be welded from top to bottom to overlap slightly the first half joint. Preferably, the welding operation on each half will be accomplished in a single pass or at least a very substantial part of the full weld on each side will be accomplished at one pass.

Thus in the example of FIGURE 2, the right half of the pipe P will first be cut from top to bottom by the high speed cutting disc 71. This disc is first started rotating about its own axis until it attains full speed. It is next swung about pivot 74 into contact with the top of the pipe until it cuts through the pipe. Next, it is moved counterclockwise around the pipe to a point just beyond the bottom, cutting all the way through as it goes. This counterclockwise motion will be referred to as the reverse direction. Thereafter, the cutting motor 75 is stopped and the cutting wheel is withdrawn from the slot by motor 85 swinging it around pivot 74, after which the plate 41 is rotated by travel motor 45 until welding electrode 51 is brought to the top of the pipe. The wire feed motor 63 is then started. As soon as it has attained full speed, and the other operations such as turning on the welding current, turning on the inert shielding gas, turning on the water, and properly orienting the weld head with respect to the freshly cut slot or kerfs are completed, the clutch 62 is thrown in. Welding proceeds counterclockwise from the top to substantially as far as the joint has been cut.

In the next part of the operation, the other half of the pipe is cut in the forward or clockwise direction from top to bottom, the cutting extending slightly into the freshly formed weld at the bottom. For this, the cutter is first positioned at the top by motor 45. It stops there. Cutter 71 is next brought up to full cutting speed by motor 75, is then lowered to contact and cut through the pipe by its in-out positioning motor 85, and then travels forwardly or clockwise to cut the right half of the joint, as seen in FIGURE 2. Finally, the weld is started up, with necessary preliminaries, and proceeds clockwise from top to bottom or in the forward direction to connect with the first weld. After this the welding electrode (and cutting disc) are both moved clear of the pipe. The clamping means 79, 80 may now be released, the internal clamp 77 collapsed, and both the welding apparatus 31 and the internal clamp 77 are brought forward for the next welding operation.

Now, referring to FIGURE 3, there is shown a drive train 46 having parallel elements which move respectively along four tracks 1A, 1B, 1C and 1D. These elements each carry dogs or traveling control elements, each adapted to actuate limit switches or so-called microswitches, at the proper time to perform control functions which cause the various operations described above to occur in the desired sequence. It has already been suggested that the four tracks are designed to provide operative sequence of the necessary functions in either direction of rotation of the main head plate 41. Where a chain drive is used as the driving element 46, FIGURE 3, it may extend around pulleys or sprockets 46a, 46b, 46c and 46d, mounted on the movable carrier 41, and moving around a large rack or sprocket 46e, FIGURE 2, on the stationary frame 31. Although the rack or sprocket 46e is not a full circle in form as herein shown, it extends around a major and sufficient part of a full circle so that the chain 46 maintains continuous driving control over the support plate 41. Hence, as motor 45 operates, there is always positively controlled drive for the head plate 41, no matter where it may be positioned around the pipe.

The chain 46 then will carry the means to operate limit switches, so that each switch opens or closes at the proper time as the appropriate dog or actuator comes along over one of the four tracks 1A, 1B, 1C or 1D. These limit switches or micro-switches will be operated at precisely the proper time to activate a circuit or to initiate, stop or alter a particular operation as will be explained in greater detail. The operations which are to be carried out and their proper sequence are predetermined. Thus the control switches and the actuating elements 90, 91, etc., which are adjustable, are so located as to be operated automatically at the appropriate point on the appropriate track.

Figure 5:
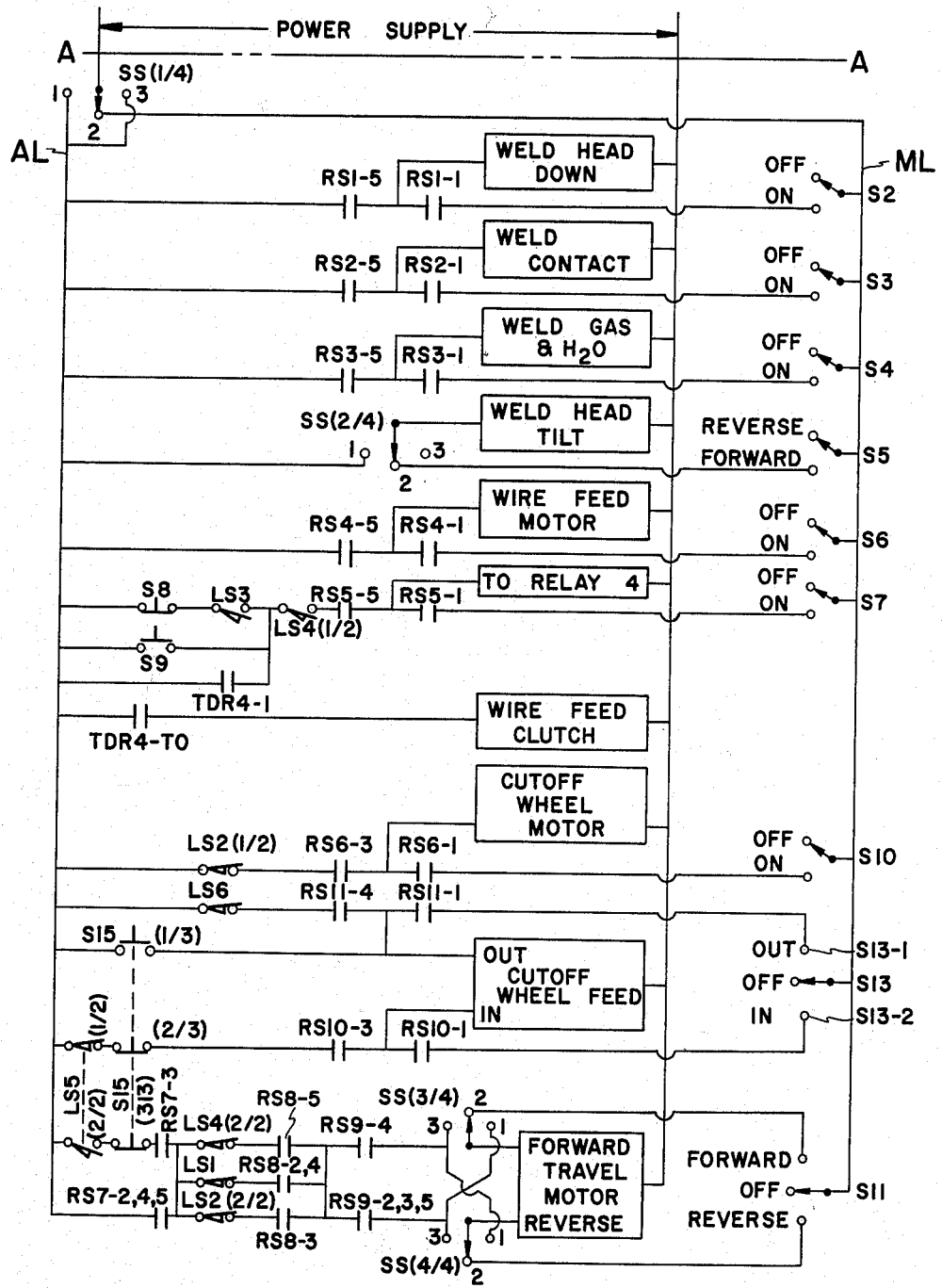
FIGURE 5 is a detailed wiring diagram, also showing schematically some of the operating functions of the system of FIGURE 1.

Control of the entire operation is vested primarily in two multi-pole, multi-throw switches which are shown diagrammatically in FIGURES 1 and 5. These are the selector switch SS which is a 4-pole, 3-position switch and the rotary switch RS which is a 12-bank, 5-position switch. The latter is the heart of the control system and it greatly simplifies the overall control problem. A typical operational sequence of cutting and welding was mentioned above.

*Operational Sequence—Automatic Cycle*

(1) Assume that the equipment is set in position on the end of the installed pipe, or a first section which is to be extended. This will be referred to as the old pipe. A new section is moved into place aligned with and abutting end to end against the old pipe. In FIG. 2, the old pipe is at the rear.

The internal clamp 77 is tightened first in the old section, then its front half it tightened in the new pipe. This firmly establishes the relative positions of the abutting or juxtaposed pipe ends. It may be noted that the clamp may be electrically operated, or hydraulically; such operations are conventional and are not shown herein.. For the present purposes, the clamp is cut away beneath the weld line, so as not to interfere with cutting or welding operations. A back-up member behind the weld is unnecessary, although a movable back-up may be employed in special circumstances if desired.

(2) With the new pipe clamped in place, the operator moves the selector switch SS (FIGURE 1) to the "2"

or manual position. This is a 4-pole 3-throw switch and contacts SS1/4, SS2/4, SS3/4 and SS4/4 (FIGURE 5) are all closed. Functions of the latter will be explained below. SS1/4 energizes the manual line ML, so that any part of the mechanism may now be tested, e.g., by means of the manual switches S2 to S13 in panel 21, FIGURE 1. If desired, the clamp controls may also be on this line. Assuming that all the emergency limit switches, or safety devices, are closed, the system is found ready for automatic operation. Rotary switch RS, FIGURE 1, is in position "1," manual. All of its "1" positions are closed.

(3) Selector switch SS is now moved to the "1" automatic reverse position. This energizes the automatic line AL through SS1/4 and energizes circuits for control of travel of head 41 through SS3/4 and SS4/4 which also are closed, lower part of FIGURE 5. SS2/4 is also closed for a separate purpose.

Figure 6:
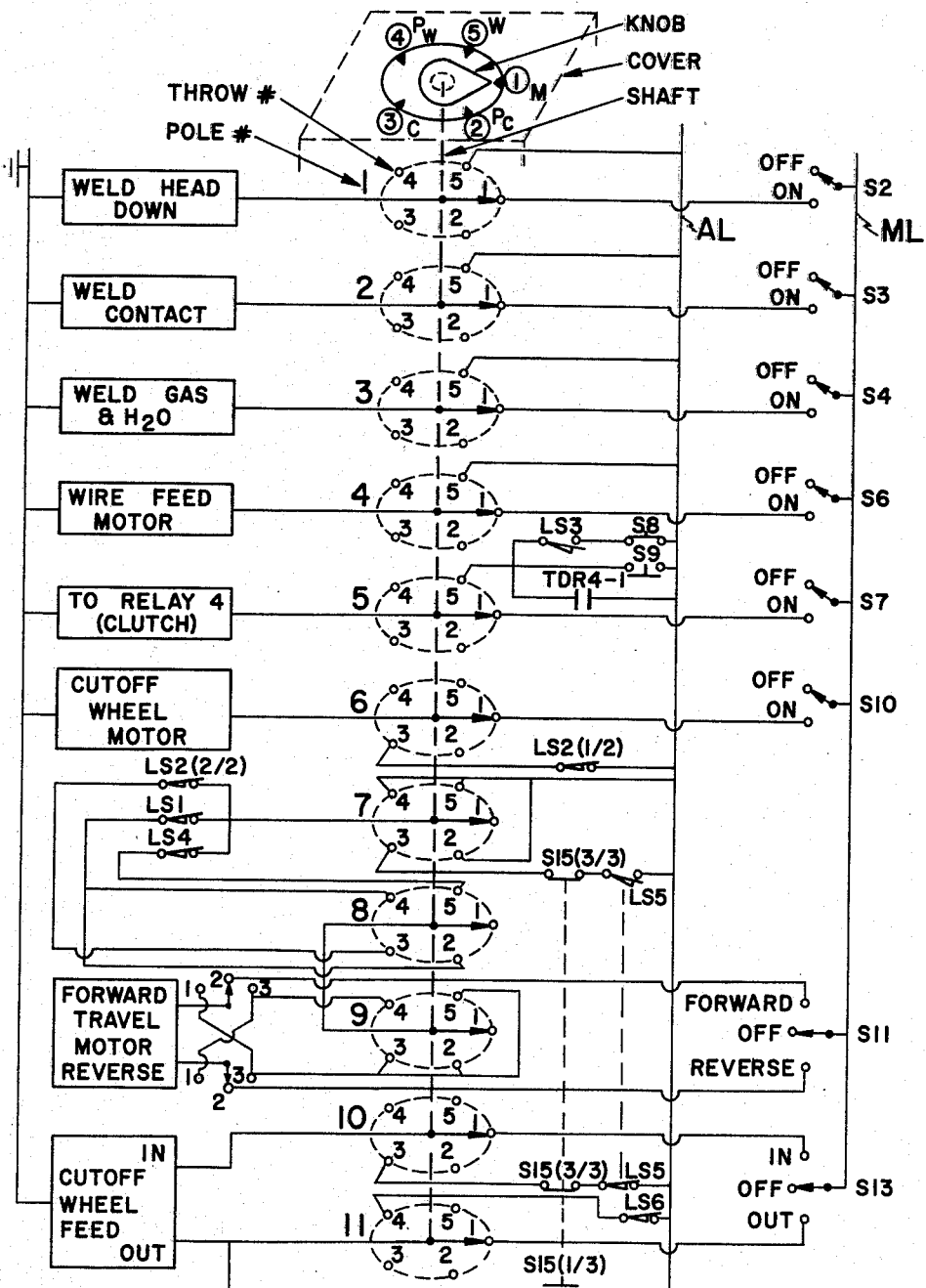
FIGURE 6 is a diagrammatic view of a multipole rotary switch mechanism forming an important component of the invention.

(4) The rotary switch RS, FIGURES 1, 6, which is the major controller, is now moved manually to its second or "2" position by the operator. This closes RS7–2, RS8–2 and RS9–2, i.e., it closes the circuits on all poles having circuits connected to the No. 2 contacts. Some do not. A limit switch LS–1, see also FIGURE 3, is normally closed so that current flows from the automatic line AL to the reverse travel relay. The closed circuit energizes motor 45 to drive the head plate 41 around the pipe in a reverse or counterclockwise direction until limit switch LS–1 is opened by contacting a suitably positioned dog 90 on track 1A, FIGURE 3. The cutter is now positioned at the top of the pipe joint.

(5) RS is next turned manually to position "3," closing RS6–3, RS10–3, RS11–3, RS7–3, RS8–3 and RS9–3. The cutter drive motor 75 is turned on by RS6–3. Through RS10–3 and LS–5(1/2), the feed-in motor 85, FIGURE 2, swings the cutter towards the pipe P around pivot 74, continuing until it cuts through the pipe wall thickness, whereupon LS–5(1/2) is opened by an adjustable projection (not shown) on plate 41. This adjustment provides for wear of the cutter wheel. Simultaneously with the opening of LS–5(1/2) in the cut-off wheel feed circuit, the normally open side of limit switch LS–5(2/2) is closed in the travel circuit. This energizes the reverse travel relay and the cutter proceeds counterclockwise around the pipe, cutting a narrow kerf of uniform width as it goes. When cutting has proceeded far enough, another limit switch LS–2(2/2) in the travel circuit (see FIGURE 3) is contacted and opened by a dog 93 on track 1B. This stops the travel. At the same time, the normally closed side of limit switch LS–2(1/2) in the cut-off wheel motor circuit is opened in the same manner, to shut off the cutter motor.

(6) RS is now moved to position "4" to bring the welding head into position to start welding. This closes RS7–4, RS8–4 and RS9–4 to activate the forward travel relay. Motor 45 moves the head plate 41 clockwise to bring the welding electrode 51 to the top of the pipe. At this point LS–1 is again opened, this time by dog 91, track 1A, FIGURE 3, which dog is positioned to give proper timing to "position weld" operations. At the same time, RS11–4 has been closed also, to energize the cut-off feed motor 85, FIGURE 2, to drive the cutter out of the groove, swinging it about its axis 74 until a stop, not shown, on travel frame 41 opens a limit switch LS–6.

(7) RS is now brought to position "5" for welding. This closes RS7–5, RS8–5 and RS9–5, allowing the travel motor to be energized in the reverse travel direction. This also closes RS1–5 to bring the welding head down to its welding position close to the pipe. It also closes the weld contact relay through RS2–5, turns on the gas purge and cooling water through RS3–5, and starts the wire feed motor through RS4–5. RS5–5 also is closed for a purpose to be explained. The clutch 62 which drives the wire feed rolls remains open until both the wire feed motor 63 and traveling motor 45 have reached full speed and the head or electrode 51 is in correct starting position for welding. As the head begins to move, the normally open limit switch LS–3 is closed by a dog 94 on track 1C. The clutch 62 now snaps on, giving substantially instantaneous wire feed at full speed. This wire feed is continued as the welding progresses, the wire preferably burning off about the middle of the pipeline thickness and flowing into place by surface tension to neatly fill the groove from top to bottom at a single pass. (In welding pipes of too great thickness for a single pass, a partial V-groove may be formed at the outside, the inner part being cut to form the narrow, parallel walled kerf which this present equipment welds so efficiently at a single pass.) The welding operation continues until the limit switch LS–4, a double pole switch, is opened by traveling dog 97 on track 1D, FIGURE 3. One pair of contacts LS–4(2/2) opens this circuit. The other contacts LS–4(1/2) are also opened, de-energizing TD relay 4, which in turn starts a time delay circuit opening of time-out switch TDR–4(TO). The latter, keeping the circuit closed momentarily through RS5–5, permits the wire feed clutch to remain engaged for a brief time, to continue feeding wire to the arc until the crater in the weld at the end of the cut is filled. Thereupon, the circuit is opened by the timed delay and welding ceases. The welding voltage is still on, also the purge gas and cooling water. The operator turns these off by moving either SS or RS to manual position. Obviously, these may be shut off automatically, if desired, through a time delay relay of the type used in the wire feed clutch circuit. The switches would be in series respectively with the "weld head down," "weld contact," "weld gas purge," etc. relays, these relay switches to be opened after the clutch 62 is opened.

(8) Upon turning RS to position "1," all the welding functions are terminated. To continue the operation, the next sequence of steps is substantially the same as recited above and they will be described only briefly:

(9) SS is moved to position "1." This tilts the welding head for the forward weld, reversing the leads to the travel motor 45 so that the carriage or head travels clockwise upon moving RS to position "2." Dog 91 on track 1A engages LS–1 to open the circuit established through RS7–2, RS8–2, RS9–2 and SS3/4. This stops the cutter in proper starting position.

(10) RS is now turned manually to position "3," closing RS7–3, RS8–3 and RS9–3 in the travel motor (45) circuit. SS4/1 remains closed. LS–5 in the travel circuit, however, is open and does not close until the cutting motor has been started up through RS6–3 and the feed-in motor has been started through RS10–3. When the cutter hits bottom, cutting through the pipe wall, LS–5(1/2) in the cut-off wheel feed circuit contacts the adjustable stop on plate 41 previously mentioned and is opened, stopping the in-out feed motor 85. This also closes LS–5(2/2) in the travel circuit, completing the forward travel relay circuit through RS7–3, RS8–3, RS9–3 and SS3/4. Cutting now proceeds clockwise until LS–2 in the cut-off motor circuit is opened by contacting dog 92 on track 1B. The travel motor is also stopped by opening of LS–2(2/2) in the travel motor circuit.

(11) RS is next turned to position "4," bringing the welder into top position where it stops as LS–1 is contacted by dog 91, track 1A, and is opened.

(12) The operator sets RS in position "5," and the same sequence takes place as in paragraph 7 above, except that the travel is clockwise, through circuits controlled by SS–1.

(13) Finally, the welding head and associated parts are retracted, power turned off, machine released from the pipe, the clamp contracted and pulled through the new joint to the next weld position where the machine is relocated and the operations repeated.

In case of malfunctions or failure of essential components, the emergency stop button 17, FIGURE 1, is pushed, preventing or stopping automatic operation until malfunctions are corrected. Interlocks which are normally closed may open the main or automatic circuit automatically. The interlocks are activated by operation sensing devices, such as means for sensing correct amperage in the welding circuit, or opening the circuit in case of failure of gas pressure at the welding head, or failure of water circulation, etc. Such an interlock system decreases the skill or attention required of the operator.

The operator, of course, may use the emergency button to stop the operation at any stage. In either case when this is done, it does not upset a programmed operation, but merely cuts off primary power. In restarting, the operation proceeds where it left off unless the operator manipulates the manual switches.

The manual switches and their functions are obvious from FIGURES 1 and 5. S11, which controls the travel, has two poles S11–1 and S11–2 to activate respectively the forward and reverse travel relays. S2 controls the head position, up or down. S3 controls the contactor circuit. S4 controls purge gas and water, and S5 the tilt of the welding head. Normally this is spring biased to the reverse welding position, so the circuit needs to be activated only when welding in the forward direction.

S6 and S7 control respectively the wire feed motor and clutch. S10 controls the cutting motor and S13 the feed-in and feed-out motor 85. The latter is a 3-pole switch to control in and out movements. Hence poles S13–1 and S13–2 are shown in FIGURE 5.

Because of their frangibility, cutting discs can break, especially if disc rotation speed is slowed and travel still progresses. Additional emergency switch means are shown at S15–1, S15–2 and S15–3 to minimize damage. This 3-pole switch is pressed to close the feed-out circuit and stop the travel progress. If the cut-off wheel has merely slowed down, S–15 may be released as soon as it regains speed. This allows the "feed-in" to resume, although travel cannot proceed until the cutter is in the full "in" position and switch LS–5(2/2) in the travel circuit is closed. The use of LS–5 to coordinate the cut-off wheel feed-in and travel, in combination with the placement of S–15 and the use of rotary switch RS, allows the malfunction to be corrected during the automatic cycle simply and without disrupting the automatic circuit functions Switches S8 and S9, FIGURES 1 and 5, are combined in one manual toggle to allow a weld to be started other than at normal start position. The automatic-weld cycle is started with the switch in "Hold" position. When the head has traveled to the correct position for welding, the switch is moved to the "start" position, closing S–9 and allowing the wire feed clutch to be energized and the welding to commence. As with the cutting, the welding cycle will progress normally after the interruption switch is released.

The functions and operators for the limit switches are here summarized for convenience.

LS–1, normally closed, is opened by dog 90, track 1A, to stop cutter in the start-cut position for the reverse cycle; it is opened by dog 91 to stop welder in start-weld position. For the forward cycle, dogs 98 and 99, FIGURE 3, are used.

LS–2, normally closed, is opened by dog 93, track 1B, to stop the cutter motor and travel progress at the end of a reverse run; it is opened by dog 92 to stop the cutter motor at the end of a forward run.

LS–3, normally open, is closed by dog 94, track 1C, to engage the wire feed clutch as the welder starts to move in the reverse direction; and by dog 100 when in the forward direction.

LS–4, normally closed, is opened by dog 96 or 97 to stop travel at the end of a welding run in reverse or forward direction, respectively. LS–4 also de-energizes TDR–4 which in turn stops the welding wire feed.

LS–5 annd LS–6, normally closed, are opened by adjustable stops on frame 41 to control the extreme "in" and "out" cut-off wheel feed positions.

LS–5(2/2), normally open, is closed by a stop on frame 41 to initiate travel in either direction after cut-through, for a cutting operation.

From the foregoing, it will be evident that the system has considerable flexibility of control, from full manual control, to part manual, to substantially full automatic. At the same time, the automatic cycle can be interrupted, a manually controlled operation interposed, and automatic operation resumed without resetting of the automatic controller relays or circuits.

It will be obvious that numerous modifications may be made in the system without departing from the spirit of the invention. It is intended to cover modifications, alternatives and equivalents as broadly as the following claims permit, within the necessary limitations of the prior art.

What is claimed is:

1. In a welding system of the character described, the combination of manual control circuit for control of sequential welding operations, an automatic control circuit for said operations, means for changing a plurality of final controls directly from one of said circuits to the other, traveling operative means including a welding head to perform a plurality of operations under control of said final controls, and means controlled by the position of the operative means for automatically initiating subsequent operations in continued sequence as long as the automatic circuit is functioning.

2. A system according to claim 1 wherein the automatic initiating means comprise limit switch means and actuating means, one of said last named means being on the traveling operative means and the other in relatively stationary position with respect thereto.

3. In a system for forming a welded joint between juxtaposed terminal portions of metal shapes by performing a preparatory operation on said terminal portions along a predetermined line and thereafter welding along said line by feeding electrode material at rapid rate and forming a welding arc to fuse said material to join said shapes, the combination of a welding unit, and control means for said unit which comprise (1) a primary master control, (2) a set of selective manual control means for separate control of individual operations, (3) an automatic control system for performing a series of operations relating to welding in timed sequence without manual intervention, and (4) retention control means by which said sequence may be manually interrupted and manually reinstated without resetting (2) or (3).

4. A system according to claim 3 wherein the automatic control means comprise a plurality of limit switches and actuators therefore, positioned along a predetermined path for accurate sequence control.

5. A system according to claim 3 wherein said automatic control means comprise a rotary multipole-multi-throw switch for reestablishing different sets of sequences.

6. In an automatic system for forming girth welds between lengths of tubing which comprises means for performing a preliminary metal cutting operation around the juncture of said lengths involving travel of said means at least part way around the periphery of said tubing and means for subsequently performing a weld operation around said juncture, the improvement which comprises a control means for terminating said preliminary cutting operation and a control means sensitive to the cut made by the preliminary cutting means for cutting said weld operation at a predetermined point so as to automatically limit the circumferential extent of said weld substantially to the extent of that of the preliminary operation.

7. In an automatic welding apparatus for joining sections of tubing in a girth joint, which apparatus comprises means for cutting a kerf, means for welding by placing welding material in said kerf, means for moving said cutting means into and out of operative position with respect to said joint, means for traveling both said cutting means and said welding means around said joint in either direction, the combination which includes selectively positionable control means responsive to the extent of said travel and adapted to cause said cutting means to withdraw from said operative position after a desired travel distance has been cut, and other control means adapted to accurately cut off the operation of welding means as soon as the welding means has traversed the said desired distance, to avoid overrunning said cut.

8. In a cutting and welding machine for joining sections of tubing of the type which includes a cutting device for preparing a welding groove and a welding head adapted to fill said groove, the combination which comprises control means for first initiating a cutting operation, automatic means for moving said cutting device around said tubing, control means responsive to said initiating means for rotating said cutting device, other control means responsive to said initiating means for moving said device into cutting contact with said tubing, and other control means to bring said welding head into operation in predetermined timed relation with respect to the cutting operation, whereby a cut groove is first formed at least part way around the tubing joint and is subsequently welded in a single pass operation.

9. In apparatus of the type which includes means for holding two sections of tubing in end-to-end relationship for welding, cutting means for preparing said section ends for welding by performing a cutting operation part way around said joint and other means for performing an arc welding operation to fill in the cut and to join said tubing ends together, the combination which comprises a manually operable primary control for starting operation of said cutting means, automatic means responsive to said primary control for governing and terminating operation of said cutting means, and automatic means controlled at least in part by said cut for initiating, governing and terminating operation of said welding means, whereby the welding means automatically traverses and welds the whole area prepared by said preparing means and is automatically stopped when said arc is completely welded.

10. A control system for a welding machine having a welding head and a cutting head, both of which may be rotated around a circumferential pipe joint to be welded, said system comprising a stepping control device adapted to initiate cutting and welding operations in proper sequence, and control means independent of said stepping device for terminating each of said operations in response to said rotation.

11. A control system according to claim 10, wherein means are provided for moving said welding head towards and away from said joint, and wherein said moving means are controlled in response to said rotation.

12. A control system according to claim 10, wherein means are provided for moving said cutting head towards and away from said joint, and wherein said moving means are controlled in response to said rotation to operate substantially at a predetermined point in said rotation, thereby to limit the extent of the cutting operation.

13. In a welding and cutting apparatus for forming a girth welded joint between two sections of tubing placed end-to-end, which includes welding means for joining said ends, means for changing the spatial position of the tubing sections with respect to each other to establish a narrow space of predetermined uniform width between said sections, other means for traversing said welding means around said joint, the combination comprising an actuator element adapted to move along a predetermined path in response to said traverse movement, and cooperating control means selectively positionable in said path with respect to said element to perform a control operation on said changing means.

References Cited in the file of this patent

UNITED STATES PATENTS

| | | |
|---|---|---|
| 1,531,824 | Smith | Mar. 31, 1925 |
| 1,931,255 | Frantz | Oct. 17, 1933 |
| 2,105,753 | Oretegren | Jan. 18, 1938 |
| 2,429,418 | Mayer | Oct. 21, 1947 |
| 2,960,597 | Bruno et al. | Nov. 15, 1960 |
| 2,979,598 | Laslo | Apr. 11, 1961 |
| 3,005,899 | Jensen et al. | Oct. 24, 1961 |